United States Patent
Bai

(10) Patent No.: US 7,606,501 B2
(45) Date of Patent: *Oct. 20, 2009

(54) SYSTEM AND METHOD FOR GENERATING OPTICAL RETURN-TO-ZERO SIGNALS WITH ALTERNATING BI-PHASE SHIFT AND FREQUENCY CHIRP

(75) Inventor: Yu Sheng Bai, Los Altos Hills, CA (US)

(73) Assignee: FutureWei Technologies, Inc., Plano, TX (US)

(*) Notice: Subject to any disclaimer, the term of this patent is extended or adjusted under 35 U.S.C. 154(b) by 494 days.

This patent is subject to a terminal disclaimer.

(21) Appl. No.: 11/336,619

(22) Filed: Jan. 20, 2006

(65) Prior Publication Data

US 2006/0193228 A1 Aug. 31, 2006

Related U.S. Application Data

(60) Provisional application No. 60/656,610, filed on Feb. 25, 2005.

(51) Int. Cl.
*H04B 10/04* (2006.01)
(52) U.S. Cl. .................. 398/183; 398/182; 398/186; 398/188; 398/199; 359/245; 359/237; 359/238; 359/239; 385/2; 385/14; 385/31
(58) Field of Classification Search .............. 398/182, 398/183, 184, 185, 186, 187, 188, 189, 192, 398/190, 191, 193, 194, 199, 200, 201, 154, 398/155, 198; 359/237, 245, 238, 248, 239; 385/140, 14, 31, 1, 2, 3
See application file for complete search history.

(56) References Cited

U.S. PATENT DOCUMENTS 5,625,722 A 4/1997 Froberg et al.
6,535,316 B1 3/2003 Mizuhara
6,542,280 B2 4/2003 Walklin
7,346,283 B2 * 3/2008 Kao et al. .................. 398/185
2002/0196508 A1 12/2002 Wei et al.
2004/0109698 A1 * 6/2004 Kim et al. .................. 398/199
2006/0193229 A1 * 8/2006 Bai .......................... 369/59.23

FOREIGN PATENT DOCUMENTS

CN 1494251 5/2004

(Continued)

OTHER PUBLICATIONS

Communication from the European Patent Office of EP Application No. 06 705 682.0-2415, dated Apr. 8, 2008.
Forzati, Marco et al., "Reduction Of Intrachannel Four-Wave Mixing Using The Alternate-Phase RZ Modulation Format," IEEE Photonics Technology Letters, vol. 14, No. 9, pp. 1285-1287, Sep. 2002.

(Continued)

*Primary Examiner*—Hanh Phan
(74) *Attorney, Agent, or Firm*—Townsend and Townsend and Crew LLP

(57) ABSTRACT

A system and method for generating an optical return-to-zero signal with frequency chirp. The system includes a bit separator configured to receive an electrical non-return-to-zero signal and generate a first input signal and a second input signal. Additionally, the system includes a first driver configured to receive the first input signal and generate a first driving signal. The first driving signal is proportional to the first input signal in signal strength. Moreover, the system includes a second driver configured to receive the second input signal and generate a second driving signal. The second driving signal is proportional to the second input signal in signal strength. Also, the system includes a light source configured to generate a light, and an electro-optical modulator.

31 Claims, 11 Drawing Sheets

FOREIGN PATENT DOCUMENTS

| | | |
|---|---|---|
| CN | 1507178 | 6/2004 |
| CN | 1543113 | 11/2004 |
| EP | 0059758 A1 | 9/1982 |
| EP | 0343266 A1 | 11/1989 |
| EP | 0 718 990 A | 6/1996 |
| EP | 1 128 580 A2 | 8/2001 |
| EP | 0 977 382 A2 | 2/2002 |
| JP | 2003-087201 | 3/2003 |

OTHER PUBLICATIONS

Miyamoto, Y. et al., "320 Gbit/s (8×40 Gbit/s) WDM Transmission Over 367km With 120km Repeater Spacing Using Carrier-Suppressed Return-To-Zero Format," Electronics Letters, Vol. 35, No. 23, pp. 2041-2042, Nov. 11, 1999.

* cited by examiner

SYSTEM AND METHOD FOR GENERATING OPTICAL RETURN-TO-ZERO SIGNALS WITH ALTERNATING BI-PHASE SHIFT AND FREQUENCY CHIRP

CROSS-REFERENCES TO RELATED APPLICATIONS

This application claims priority to U.S. Provisional Application No. 60/656,610, filed Feb. 25, 2005, which is incorporated by reference herein.

The following two commonly-owned co-pending applications, including this one, are being filed concurrently and the other one is hereby incorporated by reference in its entirety for all purposes:

1. U.S. patent application Ser. No. 11/336,658, in the name of Yu Sheng Bai, titled, "System and Method for Generating Optical Return-to-Zero Signals with Alternating Bi-Phase Shift,"; and 2. U.S. patent application Ser. No. 11/336,619, in the name of Yu Sheng Bai, titled, "System and Method for Generating Optical Return-to-Zero Signals with Alternating Bi-Phase Shift and Frequency Chirp,".

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates in general to telecommunication techniques. More particularly, the invention provides a system and method for generating optical return-to-zero signals with alternating bi-phase shift and frequency chirp. Merely by way of example, the invention is described as it applies to optical networks, but it should be recognized that the invention has a broader range of applicability.

Telecommunication techniques have progressed through the years. As merely an example, optical networks have been used for conventional telecommunications in voice and other applications. The optical networks can transmit multiple signals of different capacities. For example, the optical networks terminate signals, multiplex signals from a lower speed to a higher speed, switch signals, and transport signals in the networks according to certain definitions.

In optical communications, an optical signal may transmit a long distance, such as hundreds or even thousands of kilometers, in optical fiber links. The quality of received signals often can be improved by using return-to-zero (RZ) modulations instead of non-return-to-zero (NRZ) modulations. For example, a signal under return-to-zero modulation includes logic low and high states, such as ones represented by "0" and "1" respectively. The signal state often is determined by the voltage during one part of a bit period, and the signal returns to a resting state during another part of the bit period. As an example, the resting state is represented by zero volts. In another example, a signal under non-return-to-zero modulation includes logic low and high states, such as ones represented by "0" and "1" respectively. The signal state often is determined by the voltage during a bit period without the signal returning to a resting state during at least a part of the bit period.

The return-to-zero modulations usually can provide better resistance to signal noises than the non-return-to-zero modulations. Additionally, the isolated RZ pulses often experience nearly identical nonlinear distortions during transmission, which can be at least partially mitigated through proper dispersion compensation schemes. Hence RZ signals usually are more resistant to nonlinear distortions than NRZ signals.

FIG. 1 is a simplified conventional system for generating NRZ signals. The system 100 includes an NRZ source 110, an NRZ data driver 120, a continuous wave (CW) diode laser 130, and a data modulator 140. In contrast, the conventional system for generating RZ signals is often more complicated as shown in FIGS. 2, 3, and 4.

FIG. 2 is a simplified conventional system for generating RZ signals. The system 200 includes an NRZ source 210, a converter 215, an RZ data driver 220, a CW diode laser 230, and a data modulator 240. The data modulator 240 is an electro-optical (EO) modulator. The converter 215 can convert an NRZ signal to an RZ signal in electrical domain. The electrical RZ signal is then used to generate an optical RZ signal through the EO modulator 240. The EO modulator 240 can be either a Mach-Zehnder (MZ) modulator or an electro-optical absorptive modulator. The system 200 often generates simple RZ signals that contain no phase or frequency modulations.

FIG. 3 is another simplified conventional system for generating RZ signals. The system 300 includes an NRZ source 310, an NRZ data driver 320, a CW diode laser 330, a data modulator 340, a clock driver 350, a phase shifter 355, and a clock modulator 360. The data modulator 340 and the clock modulator 360 each are an EO modulator. The EO modulator 360 is driven by a data clock signal or a half-rate data clock signal, and is used to generate optical clock pulses. FIG. 4 is yet another simplified conventional system for generating RZ signals. The system 400 includes an NRZ source 410, an NRZ data driver 420, a directly modulated laser 430, a data modulator 440, a clock driver 450, and a phase shifter 455. The laser 430 is directly modulated with a data clock signal to generate optical clock pulses. With proper arrangements, phase or frequency modulations can be added to the optical clock pulses to generate complex RZ signals.

Among complex RZ signals, the optical carrier-suppressed return-to-zero (CSRZ) signals can provide strong transmission capabilities. For example, the CSRZ signals have alternating bi-phase shifts between adjacent bits, and are less affected by inter-symbol interferences than the simple RZ signals. Thus the CSRZ signals are more tolerant for both dispersions and nonlinear distortions. In another example, the chirped return-to-zero (CRZ) signals have substantially the same frequency chirp on each RZ pulse for a given signal. The frequency chirp can be made to compensate for the chirp induced by nonlinear effects, and further improve tolerance for nonlinear distortions. But the conventional systems for generating these RZ signals often are complex and expensive.

Hence it is highly desirable to improve techniques for generating return-to-zero signals with frequency chirp.

BRIEF SUMMARY OF THE INVENTION

The present invention relates in general to telecommunication techniques. More particularly, the invention provides a system and method for generating optical return-to-zero signals with alternating bi-phase shift and frequency chirp. Merely by way of example, the invention is described as it applies to optical networks, but it should be recognized that the invention has a broader range of applicability.

According to one embodiment of the present invention, a system for generating an optical return-to-zero signal includes a bit separator configured to receive an electrical non-return-to-zero signal and generate a first input signal and a second input signal. Additionally, the system includes a first driver configured to receive the first input signal and generate a first driving signal. The first driving signal is proportional to the first input signal in signal strength. Moreover, the system includes a second driver configured to receive the second input signal and generate a second driving signal. The second driving signal is proportional to the second input signal in signal strength. Also, the system includes a light source configured to generate a light, and an electro-optical modulator configured to receive the light, the first driving signal, and the second driving signal, modulate the light with the first driving signal and the second driving signal, and generate an optical signal. The electrical non-return-to-zero signal includes a first plurality of bits and a second plurality of bits. The first input signal includes the first plurality of bits, and the second input signal includes the second plurality of bits. The optical signal is an optical chirped return-to-zero signal.

According to another embodiment, a system for generating an optical return-to-zero signal includes a bit separator configured to receive an electrical non-return-to-zero signal and generate a first input signal and a second input signal. Additionally, the system includes a first driver configured to receive the first input signal and generate a first driving signal. The first driving signal is proportional to the first input signal in signal strength. Moreover, the system includes a second driver configured to receive the second input signal and generate a second driving signal. The second driving signal is proportional to the second input signal in signal strength. Also, the system includes a light source configured to generate a light, and an electro-optical modulator configured to receive the light, the first driving signal, and the second driving signal, modulate the light with the first driving signal and the second driving signal, and generate an optical signal. The electrical non-return-to-zero signal includes a first plurality of bits and a second plurality of bits. The first driving signal includes a third plurality of bits, and the third plurality of bits is equal to the first plurality of bits multiplied by a first negative number in signal strength. The second driving signal includes a fourth plurality of bits, and the fourth plurality of bits is equal to the second plurality of bits multiplied by a second negative number in signal strength. The optical signal is an optical chirped return-to-zero signal.

According to yet another embodiment, a system for generating an optical return-to-zero signal includes a first driver configured to receive a first electrical return-to-zero signal and generate a first driving signal. The first driving signal is equal to the first electrical return-to-zero signal multiplied by a first positive number in signal strength. Additionally, the system includes a second driver configured to receive a second electrical return-to-zero signal and generate a second driving signal. The second driving signal is equal to the second electrical return-to-zero signal multiplied by a second positive number in signal strength. Moreover, the system includes a light source configured to generate a light, and an electro-optical modulator configured to receive the light, the first driving signal, and the second driving signal, modulate the light with the first driving signal and the second driving signal, and generate an optical signal. The first electrical return-to-zero signal is associated with a first data rate, and the second electrical return-to-zero signal is associated with a second data rate. The optical signal is an optical return-to-zero signal associated with a third data rate, and the third data rate being equal to a sum of the first data rate and the second data rate.

Many benefits are achieved by way of the present invention over conventional techniques. Some embodiments of the present invention provide systems and methods for generating optical chirped return-to-zero (CRZ) signals. Certain embodiments of the present invention provides systems and methods that separate an electrical non-return-to-zero (NRZ) signal into an "even bit signal" and an "odd bit signal", and then use the two signals to drive differentially Mach-Zehnder (MZ) electro-optical (EO) modulators to generate an optical CSRZ signal with frequency chirp. Some embodiments of the present invention provide systems and methods that use only components designed for NRZ transmitters to generate optical CRZ signals. For example, only one MZ data modulator is used to generate the CRZ signals. Certain embodiments of the present invention can significantly lower the cost of a transmitter for optical CRZ signals. Some embodiments of the present invention can significantly reduce the complexity of a transmitter for optical CRZ signals. Certain embodiments of the present invention can improve reliability of a transmitter for optical CRZ signals. Some embodiments of the present invention can significantly improve performance of a fiber optical transport system. For example, the fiber optical transport system is used for transmission at a high data rate, such as a rate higher than 10 Gbps.

Certain embodiments of the present invention can provide optical CSRZ signals with negative frequency chirp. For example, the CSRZ signals with negative frequency chirp often compress to shorter pulses after transmitting a certain distance in positive-dispersion fibers. In another example, the dispersion-limited distance for the CSRZ signals with negative frequency chirp is longer than both simple CSRZ signals and standard NRZ signals. Some embodiments of the present invention can provide optical CSRZ signals with positive frequency chirp. For example, the positive chirp can enhance signal resistance to distortions caused by nonlinear effects experienced during transmission. Certain embodiments of the present invention can use two signals with identical duty cycles and synchronously interleaved, and generate an electro-optically time-division multiplexed (EOTDM) CSRZ signal at twice the data rate for each of two signals.

Some embodiments of the present invention provide systems and methods that generate two half-rate electrical return-to-zero (eRZ) signals and use these two signals to drive differentially a dual drive Mach-Zehnder modulator biased at null to generate a full rate optical CSRZ signal with negative frequency chirp. Certain embodiments of the present invention provide systems and methods that generate two half-rate electrical return-to-zero (eRZ) signals and use these two signals to drive differentially a dual drive Mach-Zehnder modulator biased at null to generate a full rate optical CSRZ signal with positive frequency chirp.

Some embodiments of the present invention provide systems and method that separate an electrical non-return-to-zero (NRZ) signal into an "even bit signal" and an "odd bit signal", and then use the two signals to drive differentially a dual drive Mach-Zehnder modulator to generate an optical CSRZ signal with negative frequency chirp. Certain embodiments of the present invention provide systems and method that separate an electrical non-return-to-zero (NRZ) signal into an "even bit signal" and an "odd bit signal", and then use the two signals to drive differentially a dual drive Mach-Zehnder modulator to generate an optical CSRZ signal with positive frequency chirp.

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates in general to telecommunication techniques. More particularly, the invention provides a system and method for generating optical return-to-zero signals with alternating bi-phase shift and frequency chirp. Merely by way of example, the invention is described as it applies to optical networks, but it should be recognized that the invention has a broader range of applicability.

Figure 1:
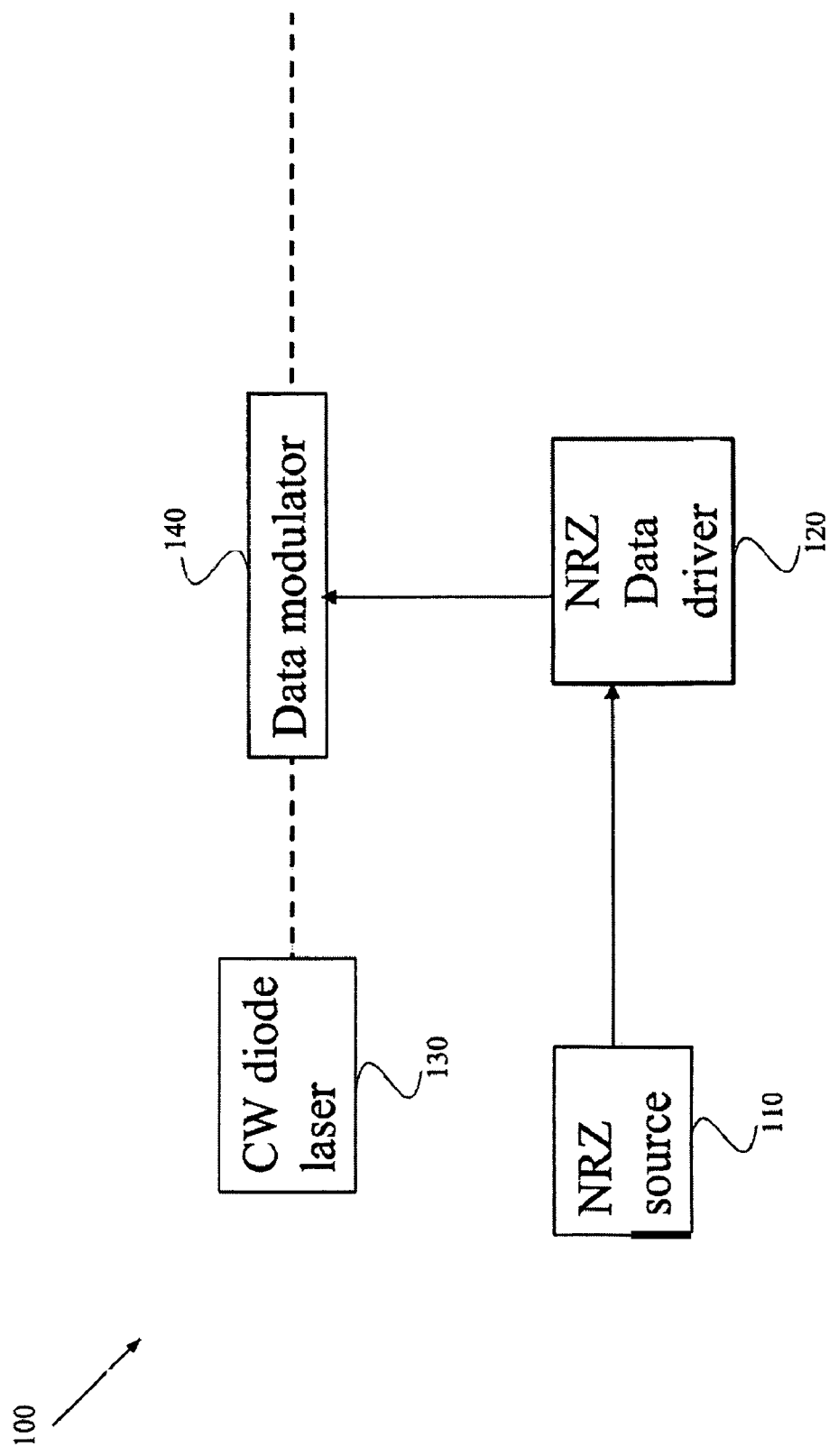
FIG. 1 is a simplified conventional system for generating NRZ signals.
Figure 2:
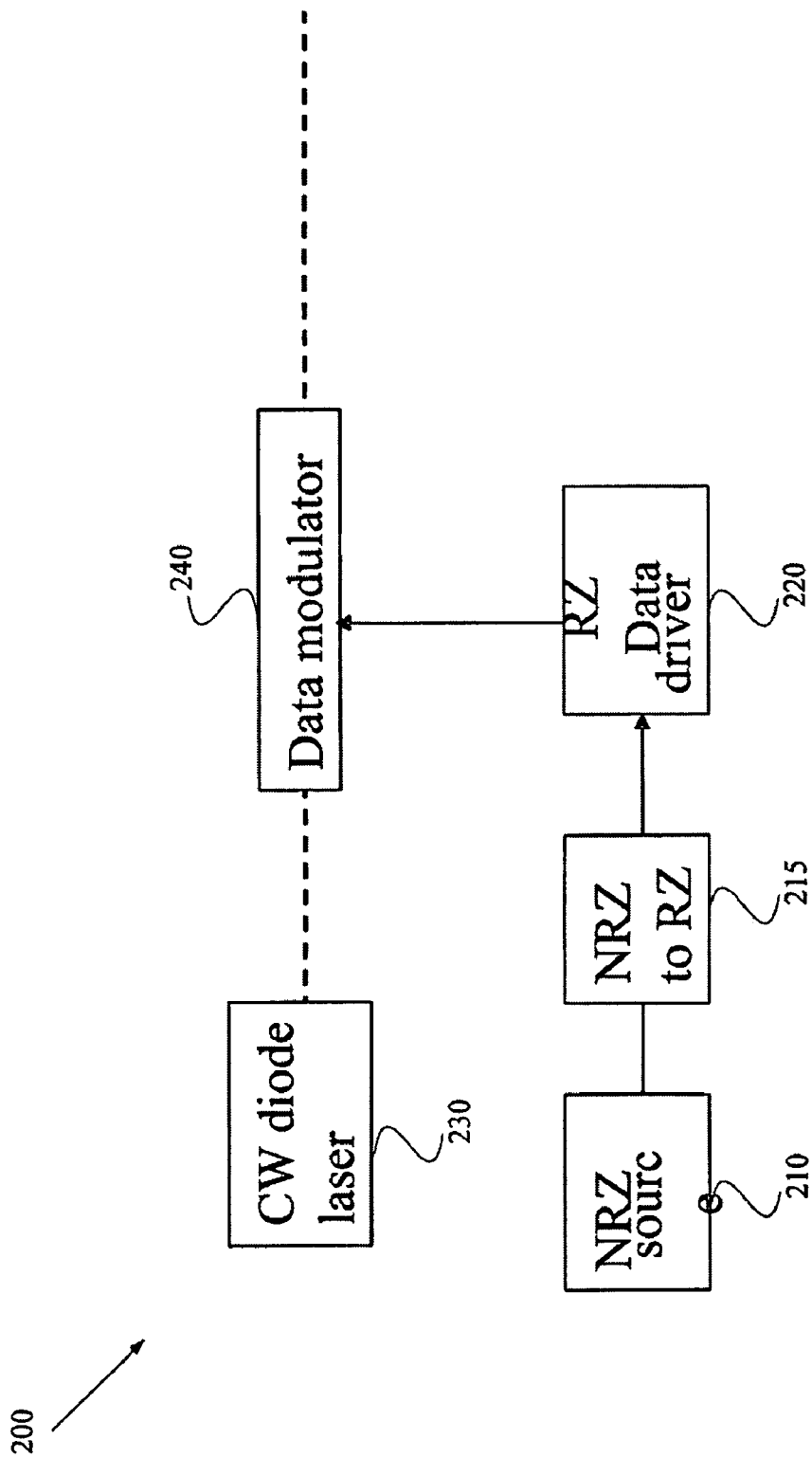
FIG. 2 is a simplified conventional system for generating RZ signals.

As shown in FIG. 2, the system 200 performs optical RZ modulations by generating RZ driving signals in electrical domain. The RZ pulses often occupy 50%, or less, of the bit period. Consequently, the generation of electrical RZ driving signals often needs to use circuit devices that have a radio-frequency (RF) bandwidth twice as wide as that needed for an NRZ electrical circuit. These wide-band components, such as wide-band drivers and/or wide-band amplifiers, usually are more expensive than the corresponding NRZ components. Additionally, the converter between electrical NRZ signals and electrical RZ signals often is a nonstandard part, and hence can be very expensive. Moreover, the system 200 usually generates intensity-modulated RZ signals with about 50% duty cycle, which often results in only marginal improvement over NRZ signals.

Figure 3:
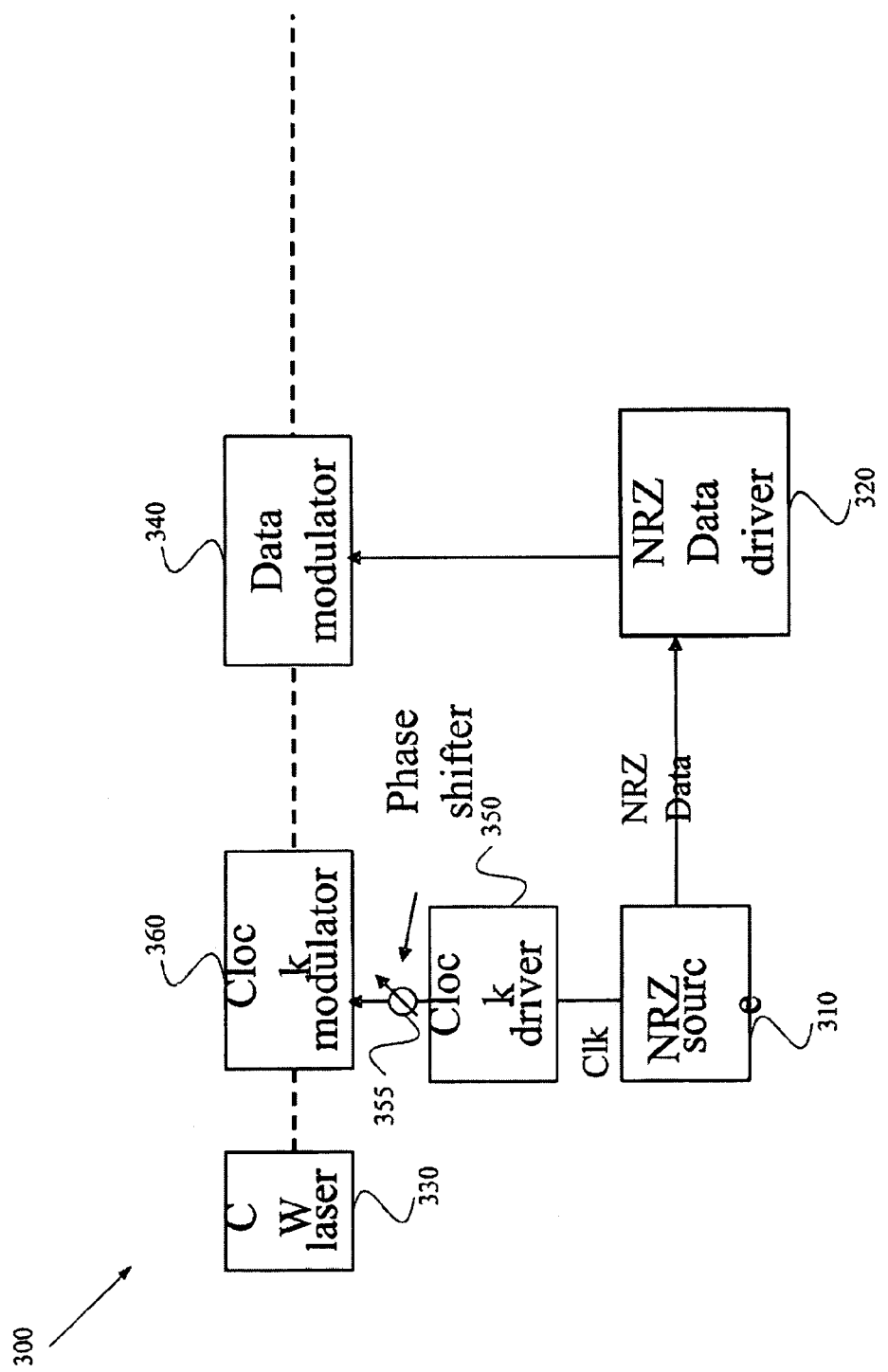
FIG. 3 is another simplified conventional system for generating RZ signals.
Figure 4:
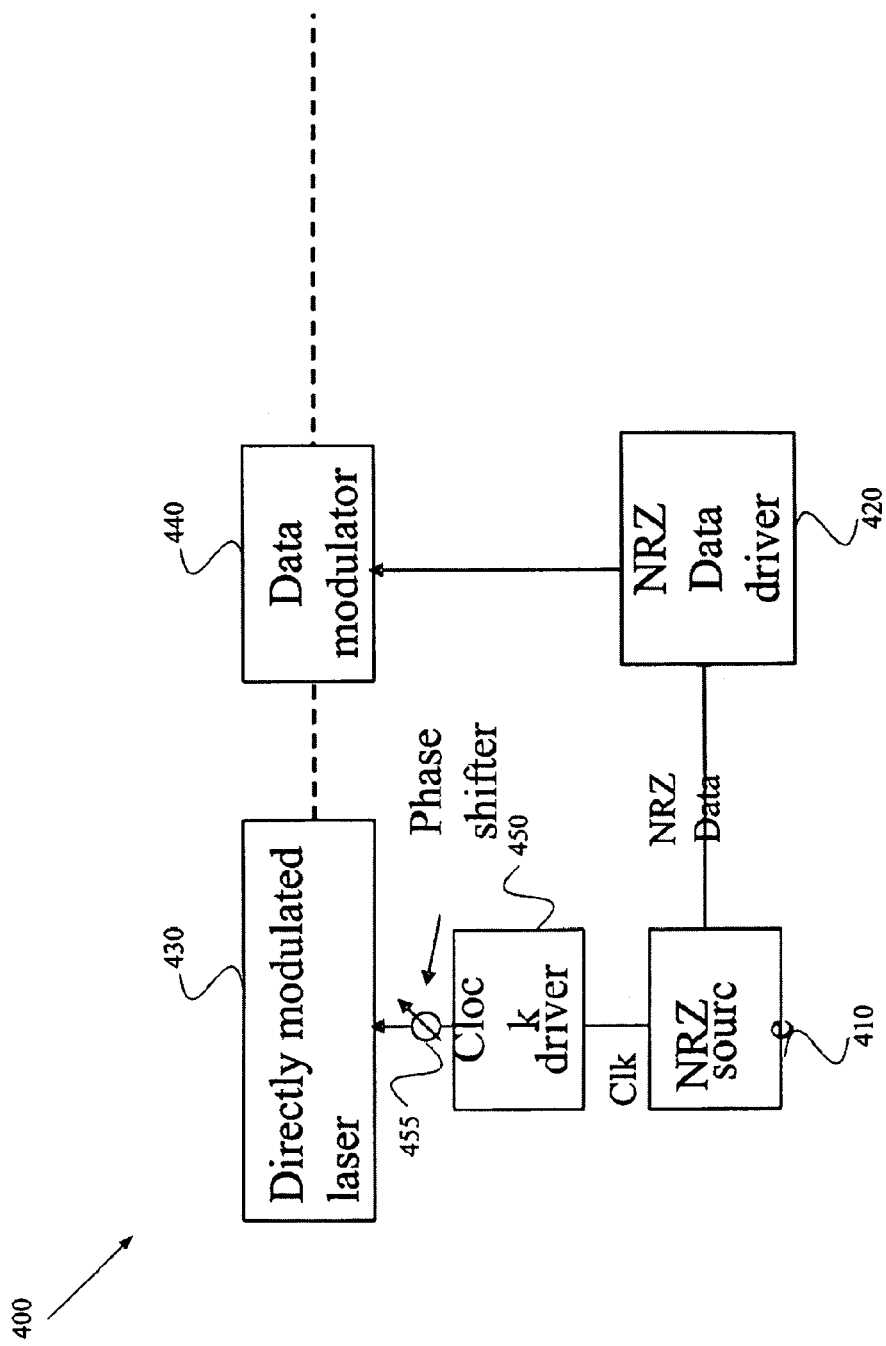
FIG. 4 is yet another simplified conventional system for generating RZ signals.

As shown in FIG. 3, the system 300 uses two EO modulators and related driving circuits to perform optical double modulations. For example, a first MZ modulator is used for clock-pulse modulations, and a second MZ modulator is used for data modulations. The clock pulses received by the first MZ modulator are often generated by nonstandard parts, which can be very expensive. Additionally, the optical data modulations and the optical clock modulations usually need to overlap temporally, so the clock pulses should be kept substantially at the center of the bit slot. But keeping the clock pulses substantially at the center of the bit slot is often difficult to achieve under various operating conditions or over a large temperature range.

To address these issues, the operation principle of a conventional MZ modulator is analyzed as follows. For a conventional MZ modulator, an incoming optical field is separated into two portions with equal strength. After each portion passes through a path with a certain optical length, the two portions are recombined at the output. Due to the interference effect, the output optical field varies with optical length difference between the two paths. There are electrodes coated along the two paths, and the optical path difference can be varied with the electrical voltages applied on the electrodes through electro-optical (EO) effect. By modulating the applied voltages, the output optical field, and hence the optical intensity is modulated. Mathematically, the output optical field is related to the input by:

$$E_{OUT}=E_{IN}/2 \cdot \{\exp[-i \cdot \eta_1 \cdot D1(t)-i \cdot \phi]-\exp[-i \cdot \eta_2 \cdot D2(t)+i \cdot \phi]\} \quad \text{(Equation 1)}$$

where $E_{IN}$ and $E_{OUT}$ represent input optical field and output optical field respectively. For example, the input optical field is the input electric field, and the output optical field is the output electric field. Additionally, D1(t) and D2(t) represent the electrical signals applied on the electrodes respectively, and $\eta_1$ and $\eta_2$ each are determined by at least EO coefficient and length of the corresponding electrode. Moreover, $\phi$ is related to the inherent path difference and DC bias voltages applied on the electrodes. For each electrode, the total applied voltage equals the sum of the corresponding DC bias voltage and the voltage related to the corresponding electrical signal.

In a conventional dual drive MZ modulator, the electrodes often are configured so that $\eta_1=\eta_2=\eta$. Additionally, the MZ modulator can be biased with proper DC voltages such that $\phi=0$. For example, with $\phi=0$, the MZ modulator is referred to as being biased at null. Hence Equation 1 can be simplified as follows:

$$E_{OUT}=E_{IN} \cdot \sin\{[V1(t)-V2(t)] \cdot 0.5\} \cdot \exp\{-i \cdot [V1(t)+V2(t)] \cdot 0.5\} \quad \text{(Equation 2)}$$

$$\text{where } V1(t)=\eta \cdot D1(t) \quad \text{(Equation 3A)}$$

$$\text{and } V2(t)=\eta \cdot D2(t) \quad \text{(Equation 3B)}$$

Figure 5:
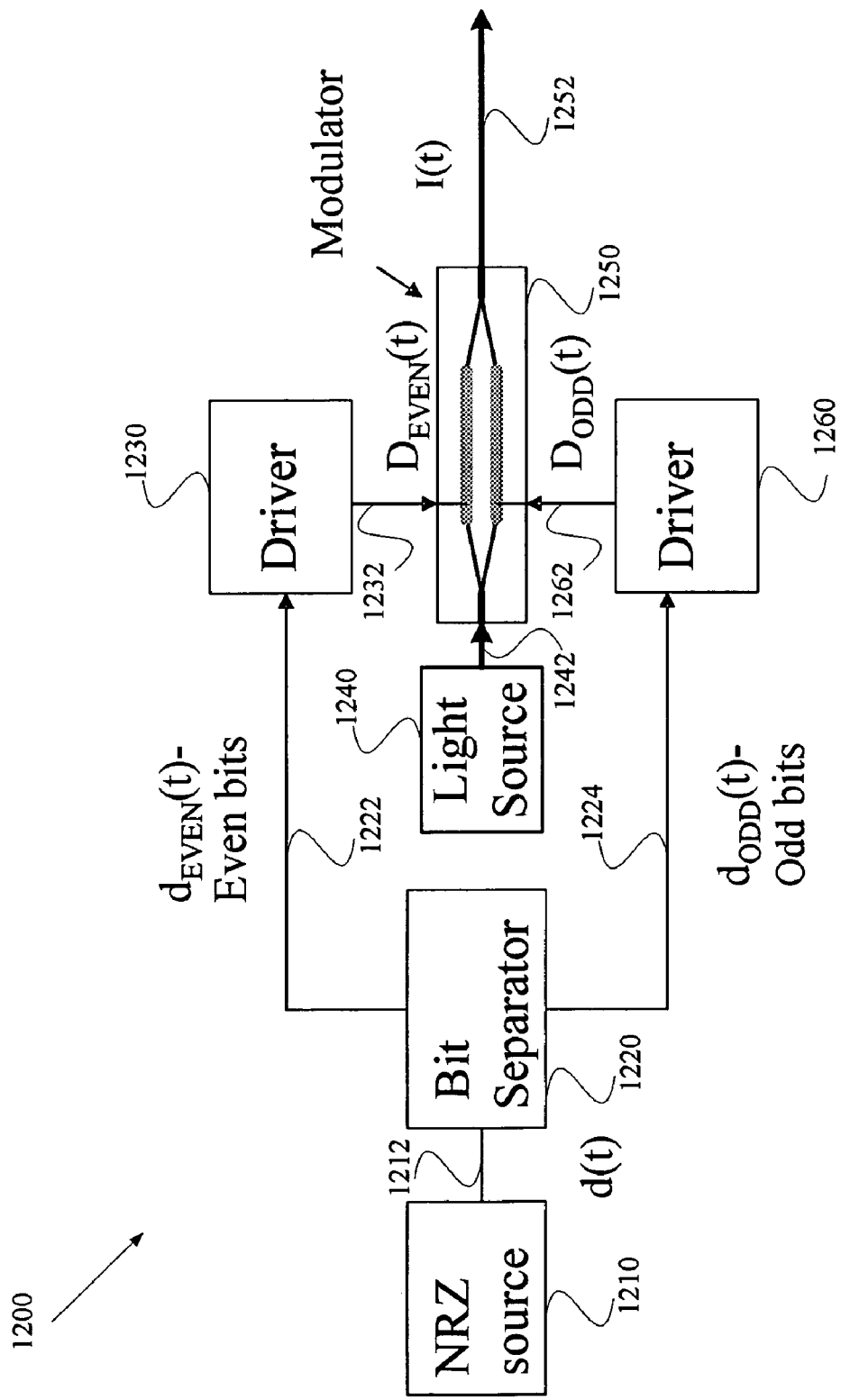
FIG. 5 is a simplified system for generating optical return-to-zero signals with alternating bi-phase shift and frequency chirp according to an embodiment of the present invention.

FIG. 5 is a simplified system for generating optical return-to-zero signals with alternating bi-phase shift and frequency chirp according to an embodiment of the present invention. This diagram is merely an example, which should not unduly limit the scope of the claims. One of ordinary skill in the art would recognize many variations, alternatives, and modifications. The system 1200 includes an NRZ source 1210, a bit separator 1220, drivers 1230 and 1260, a light source 1240, and a modulator 1250. Although the above has been shown using a selected group of apparatuses for the system 1200, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

The NRZ source 1210 provides an electrical NRZ signal 1212 to the bit separator 1220. For example, the NRZ signal 1212 switches between a logic high level and a logic low level as a function of time. The logic high level can be represented by "1", and the logic low level can be represented by "0". In another example, the NRZ signal 1212 represents data in a digital format based on the data information received from another device. In yet another example, the NRZ signal 1212 is represented by d(t).

As shown in FIG. 5, the NRZ signal 1212 is received by the bit separator 1220. In one embodiment, the bit separator 1220 separates adjacent bits in the NRZ signal 1212 and generates two signals 1222 and 1224. The signal 1222 includes bits originated from the corresponding bits in the signal 1212. For example, any two of these corresponding bits are separated by at least another bit in the signal 1212. Additionally, the signal 1224 includes bits originated from the corresponding bits in the signal 1212. For example, any two of these corresponding bits are separated by at least another bit in the signal 1212. In another example, the bits in the signal 1212 that correspond to the signal 1222 and the bits in the signal 1212 that correspond to the signal 1224 do not overlap. In yet another example, every bit in the signal 1212 corresponds to only one bit in either the signal 1222 or the signal 1224. In yet another example, the sum of the signals 1222 and 1224 is equal to the signal 1212.

In one embodiment, the signal 1212 includes even bits and odd bits, which are separated to form the signals 1222 and 1224 respectively. The signal 1222 includes the even bits from the signal 1212 and is represented by $d_{EVEN}(t)$. Additionally, the signal 1224 includes the odd bits from the signal 1212, and is represented by $d_{ODD}(t)$. In another embodiment, the signals 1222 and 1224 each are an electrical return-to-zero signal. For example, the electrical return-to-zero signal has a bit rate that is half of the bit rate of the electrical non-return-to-zero signal 1212.

The driver 1230 receives the signal 1222, and the driver 1260 receives the signal 1224. Additionally, the driver 1230 amplifies the signal 1222 and generates a driving signal 1232. The driver 1260 amplifies the signal 1224 and generates a driving signal 1262. For example, $d_{EVEN}(t)$ and $d_{ODD}(t)$ as the signals 1222 and 1224 are fed into the drivers 1230 and 1260 respectively. Accordingly, the driving signal 1232 is represented by $D_{EVEN}$, and the driving signal 1262 is represented by $D_{ODD}$. In one embodiment, the gains of the drivers 1230 and 1260 each are denoted as 2G. Hence $D_{EVEN}$ and $D_{ODD}$ are determined by:

$$D_{EVEN} = 2 \cdot G \cdot d_{EVEN} \quad \text{(Equation 4A)}$$

$$D_{ODD} = 2 \cdot G \cdot d_{ODD} \quad \text{(Equation 4B)}$$

As shown in FIG. 5, the driving signals 1232 and 1262 are received by the modulator 1250, which also receives a light 1242 from the light source 1240. For example, the light source 1240 includes a CW diode laser. The light 1242 is modulated by the driving signal 1232 and 1234 to generate an output optical signal 1252. For example, the modulator 1250 is a MZ modulator. Referring to Equations 2, 3A, 3B, 4A, and 4B, $D1(t)=D_{EVEN}$ and $D2(t)=D_{ODD}$. With proper DC bias voltages, the optical field for the output signal 1252 is $$E_{OUT} = E_{IN} \cdot \sin\{\eta \cdot G \cdot [d_{EVEN}(t) - d_{ODD}(t)]\} \cdot \exp\{-i \cdot \eta \cdot G \cdot d(t)\} \quad \text{(Equation 5)}$$

$$\text{where } d(t) = d_{EVEN}(t) + d_{ODD}(t) \quad \text{(Equation 6)}$$

For example, without the second term $\exp\{-i\cdot\eta\cdot G\cdot d(t)\}$, $E_{OUT}$ represents a simple CSRZ signal. In another example, the physical meaning of the second term $\exp\{-i\cdot\eta\cdot G\cdot d(t)\}$ is to provide a frequency chirp to the optical signal 1252 as shown below:

$$\Delta v_{CHIRP} = -\eta \cdot G \cdot d[d(t)]/dt \cdot (\tfrac{1}{2}\cdot\pi) \quad \text{(Equation 7)}$$

where $\Delta v_{CHIRP}$ represents the frequency chirp, such as an instantaneous frequency deviation. As shown in Equations 5 and 7, the output signal 1252 is a chirped returned-to-zero (CRZ) signal in one embodiment of the present invention. In one embodiment, the chirped return-to-zero signal is a frequency-modulated signal. In another embodiment, the chirped return-to-zero signal has a frequency that varies with time, the variation of frequency staying within a range.

As shown in Equation 7, the phase modulation $-\eta\cdot G\cdot d(t)$ is negatively proportional to the input NRZ data d(t) if $\eta$ is larger than zero. Hence the frequency chirp is negative in sign. In another example, the phase modulation $-\eta\cdot G\cdot d(t)$ is positively proportional to the input NRZ data d(t) if $\eta$ is smaller than zero. Accordingly, the frequency chirp is positive in sign. Additionally, the signals 1212, 1222, 1224, 1232, and 1262 each are an electrical signal according to another embodiment of the present invention.

Figure 6:
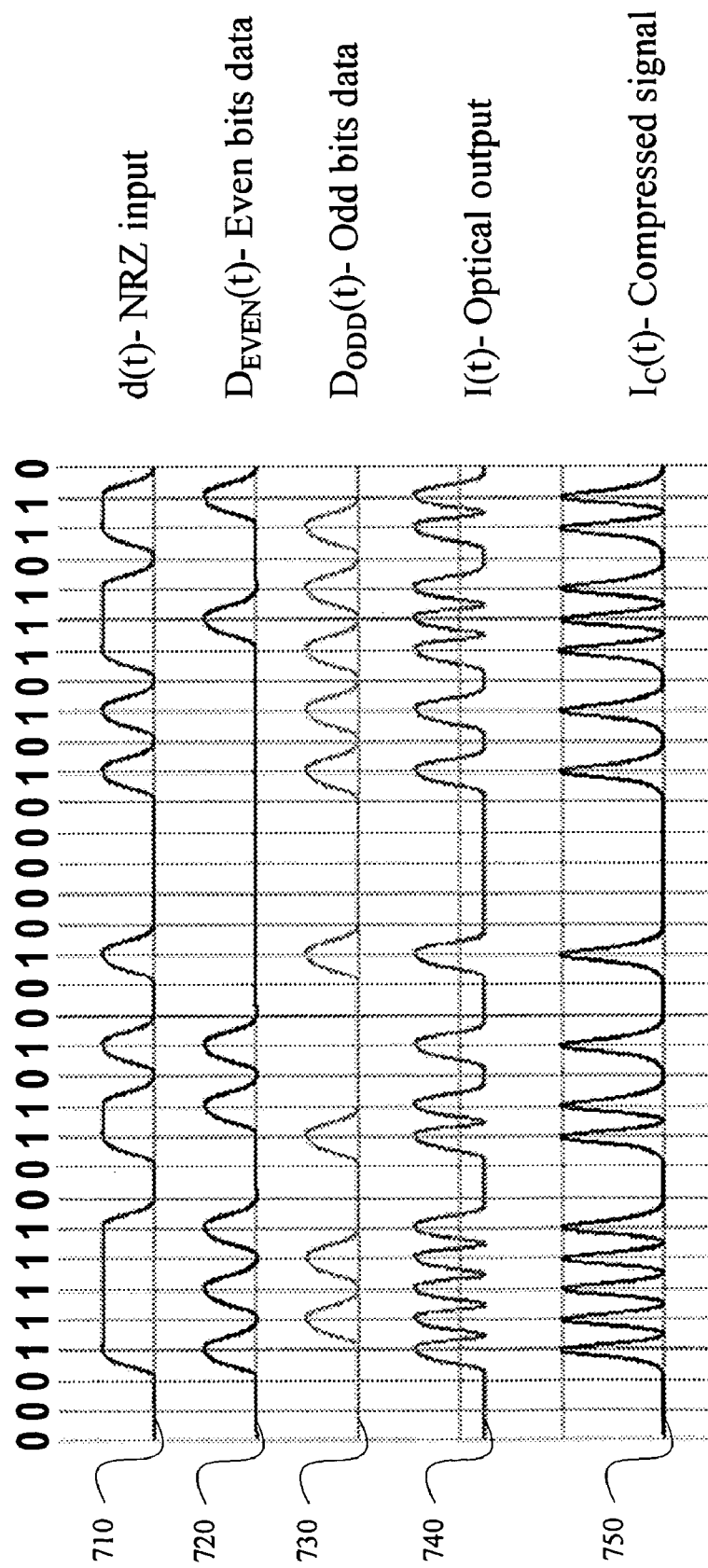
FIG. 6 shows a simplified signal diagram according to an embodiment of the present invention.

FIG. 6 shows a simplified signal diagram according to an embodiment of the present invention. This diagram is merely an example, which should not unduly limit the scope of the claims. One of ordinary skill in the art would recognize many variations, alternatives, and modifications. For example, curves 710, 720, and 730 represent the signals 1212, 1232, and 1262 respectively. Additionally, curve 740 represents the signal 1252 outputted by the modulator 1250. The curve 750 represents the signal 1252 at 10 Gbps after the signal 1252 has been transmitted in a signal mode fiber for 30 kilometers with total dispersion of 510 ps/nm. In one embodiment, the signals 1212, 1232, and 1262 are electrical signals, and the signal 1252 is an optical signal. In another embodiment, the curves 710, 720, and 730 represent signal voltage as a function of time, and the curves 740 and 750 represent signal intensity as a function of time.

As shown in FIG. 6, the NRZ signal 1212 as represented by the curve 710 includes a bit stream for 0, 0, 0, 1, 1, 1, 1, 1, 0, 0, 1, 1, 0, 1, 0, 0, 1, 0, 0, 0, 0, 0, 1, 0, 1, 0, 1, 1, 1, 0, 1, 1, and 0. These bits are separated to generate the signals 1222 and 1224, which are amplified to become the signals 1232 and 1262 respectively. For example, the signal 1232 includes even bits in the signal 1212, which are 0, 1, 1, 1, 0, 1, 1, 0, 0, 0, 0, 0, 0, 1, 0, and 1 as shown by the curve 720. In another example, the signal 1262 includes odd bits in the signal 1212, which are 0, 0, 1, 1, 0, 1, 0, 0, 1, 0, 0, 1, 1, 1, 1, and 0 as shown by the curve 730.

The signals 1232 and 1262 are received by the modulator 1250, which generates the output optical signal 1252. The intensity of the signal 1252 is shown by the curve 740, and is in the return-to-zero format. After the signal 1252 has been transmitted in a single-mode fiber at 10 Gbps for 30 kilometers with total dispersion of 510 ps/nm, the signal strength representing logic high level becomes higher, and thus provides additional resistance to noise, as shown by the curve 750.

Figure 7:
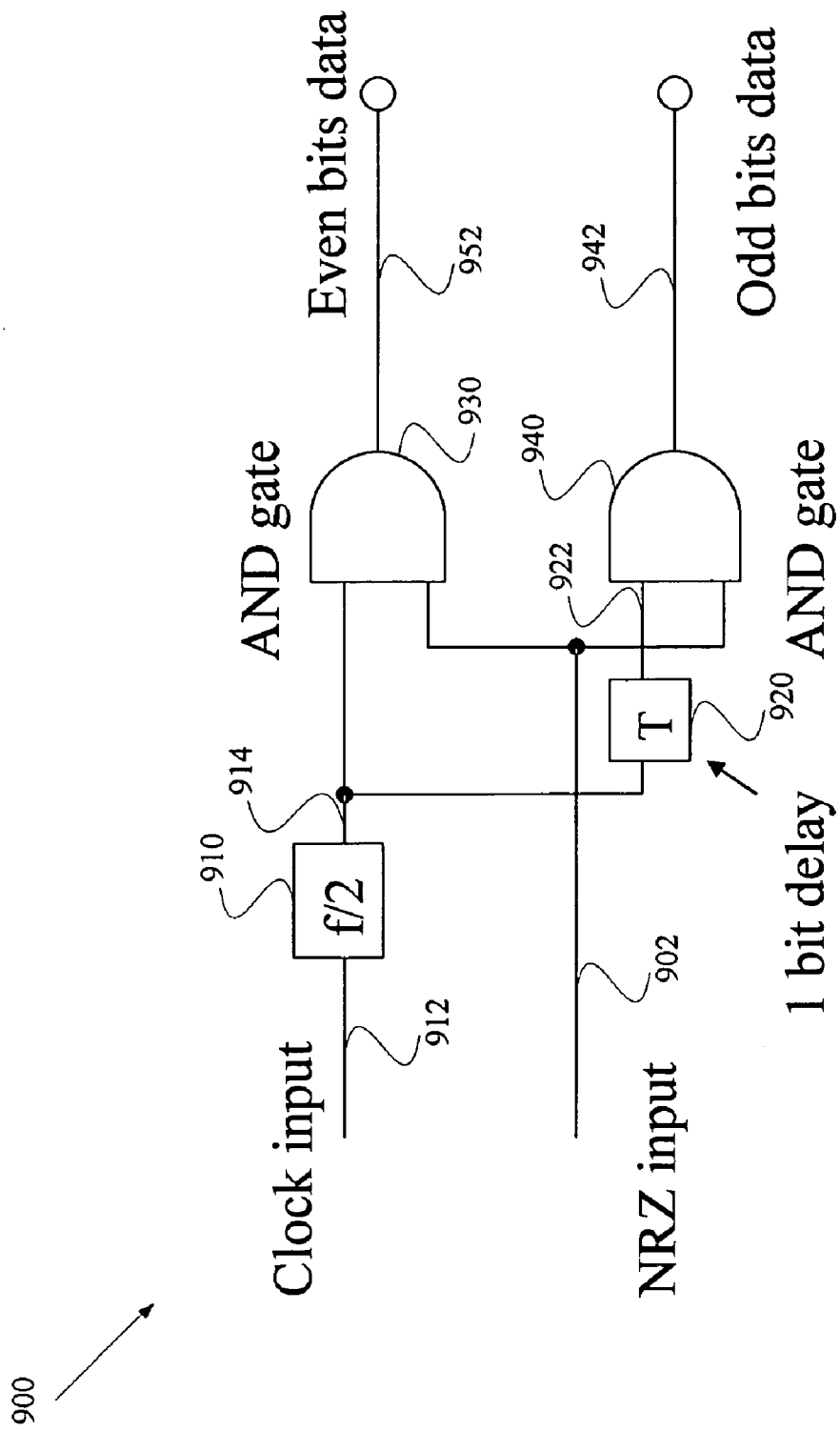
FIG. 7 is a simplified bit separator according to an embodiment of the present invention.

FIG. 7 is a simplified bit separator according to an embodiment of the present invention. This diagram is merely an example, which should not unduly limit the scope of the claims. One of ordinary skill in the art would recognize many variations, alternatives, and modifications. The bit separator 900 includes a frequency converter 910, a time delay device 920, and AND gates 930 and 940. Although the above has been shown using a selected group of apparatuses for the bit separator 900, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. For example, the bit separator 900 is the bit separator 1220. Further details of these apparatuses are found throughout the present specification and more particularly below.

The frequency converter 910 receives an input clock signal 912 and generates an output clock signal 914. For example, the input clock signal 912 has a frequency f, and the output clock signal 914 has a frequency f/m. m is a positive integer. For example, m is equal to 2. The output clock signal 914 is received by the time delay device 920 and the AND gate 930. In response, the time delay device 920 generates an output clock signal 922. The clock signal 922 is delayed by n bits in comparison with the clock signal 914. For example, n is a positive odd integer. In another example, n is equal to 1. The clock signal 922 is received by the AND gate 940. The AND gates 940 and 930 each also receive an NRZ signal 902. For example, the NRZ signal 902 is the NRZ signal 1212. In another example, the NRZ signal 902 is synchronized with the input clock signal 912. In yet another example, the frequency f of the input clock signal 912 corresponds to a clock period that is equal to the time period for each bit slot in the signal 902.

In one embodiment, the clock signal 914 includes a logic sequence of "10101010...". The AND gate 930 performs an AND logic function between the clock signal 914 and the NRZ signal 902 to generate an output signal 932. The output signal 932 includes even bits of the NRZ signal 902. For example, the output signal 932 is the signal 1222. In another embodiment, the clock signal 922 includes a logic sequence of "01010101...", which is delayed by 1 bit in comparison with the clock signal 914. The AND gate 940 performs an AND logic function between the clock signal 922 and the NRZ signal 902 to generate an output signal 942. The output signal 942 includes odd bits of the NRZ signal 902. For example, the output signal 942 is the signal 1224.

As discussed above and further emphasized here, FIG. 7 is merely an example, which should not unduly limit the scope of the claims. One of ordinary skill in the art would recognize many variations, alternatives, and modifications. For example, the input clock signal 912 has a frequency that corresponds to a clock period equal to twice of the time period for each bit slot in the signal 902. Additionally, the input clock signal 912 is synchronized with the signal 902. The frequency converter 910 is removed, and the signal 912 is received by the AND gate 930 and the time delay device 920.

Figure 8:
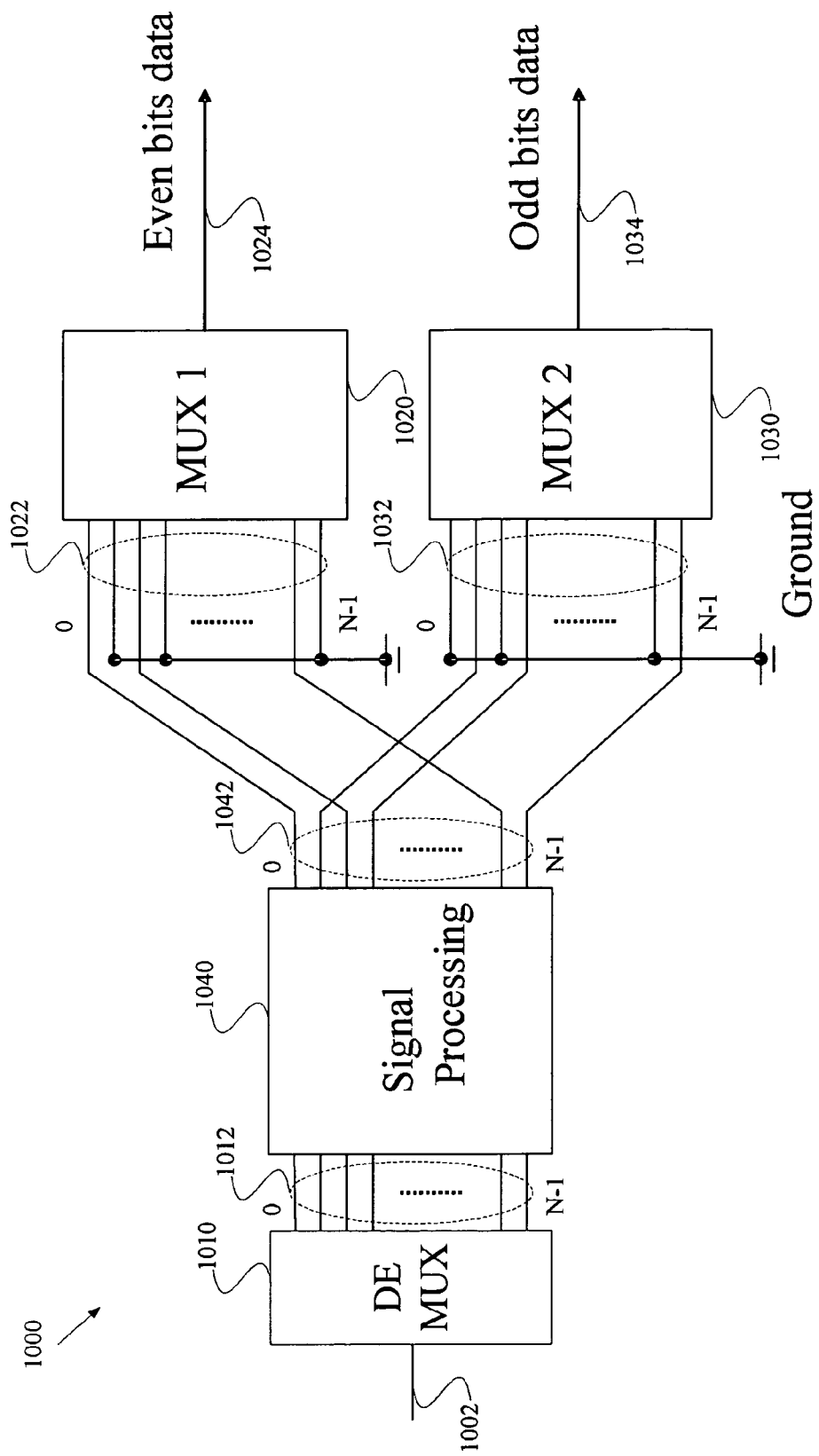
FIG. 8 is a simplified bit separator according to another embodiment of the present invention.

FIG. 8 is a simplified bit separator according to another embodiment of the present invention. This diagram is merely an example, which should not unduly limit the scope of the claims. One of ordinary skill in the art would recognize many variations, alternatives, and modifications. The bit separator 1000 includes a demultiplexer 1010, multiplexers 1020 and 1030, and a signal processing system 1040. Although the above has been shown using a selected group of apparatuses for the bit separator 1000, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. For example, the bit separator 1000 is the bit separator 1220. Further details of these apparatuses are found throughout the present specification and more particularly below.

The demultiplexer 1010 receives an NRZ signal 1002, and demultiplexes the NRZ signal 1002 into a plurality of output signals 1012. For example, the demultiplexer 1010 is a serial-to-parallel demultiplexer. In another example, the NRZ signal 1002 is the NRZ signal 1212. The plurality of output signals 1012 includes N output signals. N is an integer larger than 1. For example, the N output signals includes signal 1012_0, signal 1012_1, ... signal 1012_n, ..., and signal 1012_N−1. n is an integer equal to or larger than 0, and smaller than N. In another example, the NRZ signal 1002 corresponds to a clock frequency f, and each of the output signals 1012 corresponds to a clock frequency f/N. In yet another example, the NRZ signal 1002 includes at least an N-bit sequence, and the N-bit sequence includes bit 0, bit 1, ... bit n, ..., and bit N−1. As shown in FIG. 8, bit 0 is demultiplexed into signal 1012_0, bit 1 is demultiplexed into signal 1012_1, ..., bit n is demultiplexed into signal 1012_n, ..., and bit N−1 is demultiplexed into signal 1012_N−1.

In one embodiment, the plurality of signals 1012 is received by the signal processing system 1040. For example, the signal processing system 1040 includes a SONET framer. In another example, the signal processing system 1040 includes a forward error correction (FEC) encoder. The signal processing system 1040 processes the plurality of signals 1012 and outputs a plurality of signals 1042. The plurality of signals 1042 includes N signals. For example, the N signals include signal 1042_0, signal 1042_1, ... signal 1042_n, ..., and signal 1042_N−1. Signal 1042_0 corresponds to signal 1012_0, signal 1042_1 corresponds to signal 1012_1, ..., signal 1042_n corresponds to signal 1012_n, ..., and signal 1042_N−1 corresponds to signal 1012_N−1.

The plurality of signals 1042 are received by the multiplexers 1020 and 1030. For example, each of the multiplexers 1020 and 1030 is a parallel-to-serial multiplexer. The multiplexer 1020 includes a plurality of input terminals 1022. For example, the plurality of input terminals 1022 includes terminal 1022_0, terminal 1022_1, ..., terminal 1022_n, ..., and terminal 1022_N−1. Additionally, the multiplexer 1030 includes a plurality of input terminals 1032. For example, the plurality of input terminals 1032 includes terminal 1032_0, terminal 1032_1, ..., terminal 1032_n, ..., and terminal 1032_N−1.

If terminal 1022_0, terminal 1022_1, ..., terminal 1022_n, ..., and terminal 1022_N−1 receive signal 1042_0, signal 1042_1, ... signal 1042_n, ..., and signal 1042_N−1 respectively, the multiplexer 1020 can output a signal same as the NRZ signal 1002 if the signal processing is not performed by the system 1040. Additionally, if terminal 1032_0, terminal 1032_1, ..., terminal 1032_n, ..., and terminal 1032_N−1 receive signal 1042_0, signal 1042_1, ... signal 1042_n, ..., and signal 1042_N−1 respectively, the multiplexer 1030 can output a signal same as the NRZ signal 1002 if the signal processing is not performed by the system 1040.

For the plurality of terminals 1022, the odd-number terminals are biased to a predetermined voltage. For example, the predetermined voltage corresponds to a logic low level. In another example, each of the odd-number terminals is represented by terminal 1022_2q+1. q is an integer equal to or larger than 0, and 2q+1 is an odd integer larger than 0, and equal to or smaller than N−1. Additionally, for the plurality of terminals 1022, the even-number terminals receive respectively even-number signals among the plurality of signals 1042. For example, terminal 1022_2p receives the signal 1042_2p. p is an integer equal to or larger than 0, and 2p is an even integer equal to or larger than 0, and equal to or smaller than N−1. In response, the multiplexer 1020 generates an output signal 1024. For example, the output signal 1024 corresponds to the same clock frequency f as the NRZ signal 1002. In another example, the output signal 1024 includes the bits received from the even-number signals among the plurality of signals 1042. These bits received from the even-number signals correspond to the even bits of the NRZ signal 1002 respectively. In yet another example, the output signal 1024 is the signal 1222.

For the plurality of terminals 1032, the even-number terminals are biased to the predetermined voltage. As an example, each of the even-number terminals is represented by terminal 1032_2p. p is an integer equal to or larger than 0, and 2p is an even integer equal to or larger than 0, and equal to or smaller than N−1. Additionally, for the plurality of terminals 1032, the odd-number terminals receive respectively odd-number signals among the plurality of signals 1042. For example, terminal 1023_2q+1 receives the signal 1042_2q+1. q is an integer equal to or larger than 0, and 2q+1 is an odd integer larger than 0, and equal to or smaller than N−1. In response, the multiplexer 1030 generates an output signal 1034. For example, the output signal 1034 corresponds to the same clock frequency f as the NRZ signal 1002. In another example, the output signal 1034 includes the bits received from the odd-number signals among the plurality of signals 1042. These bits received from the odd-number signals correspond to the odd bits of the NRZ signal 1002 respectively. In yet another example, the output signal 1034 is the signal 1224.

As discussed above and further emphasized here, FIG. 8 is merely an example, which should not unduly limit the scope of the claims. One of ordinary skill in the art would recognize many variations, alternatives, and modifications. For example, the signal processing system 1040 is removed. The plurality of signals 1012 is directly received by the multiplexers 1020 and 1030 as the plurality of signals 1042.

Figure 9:
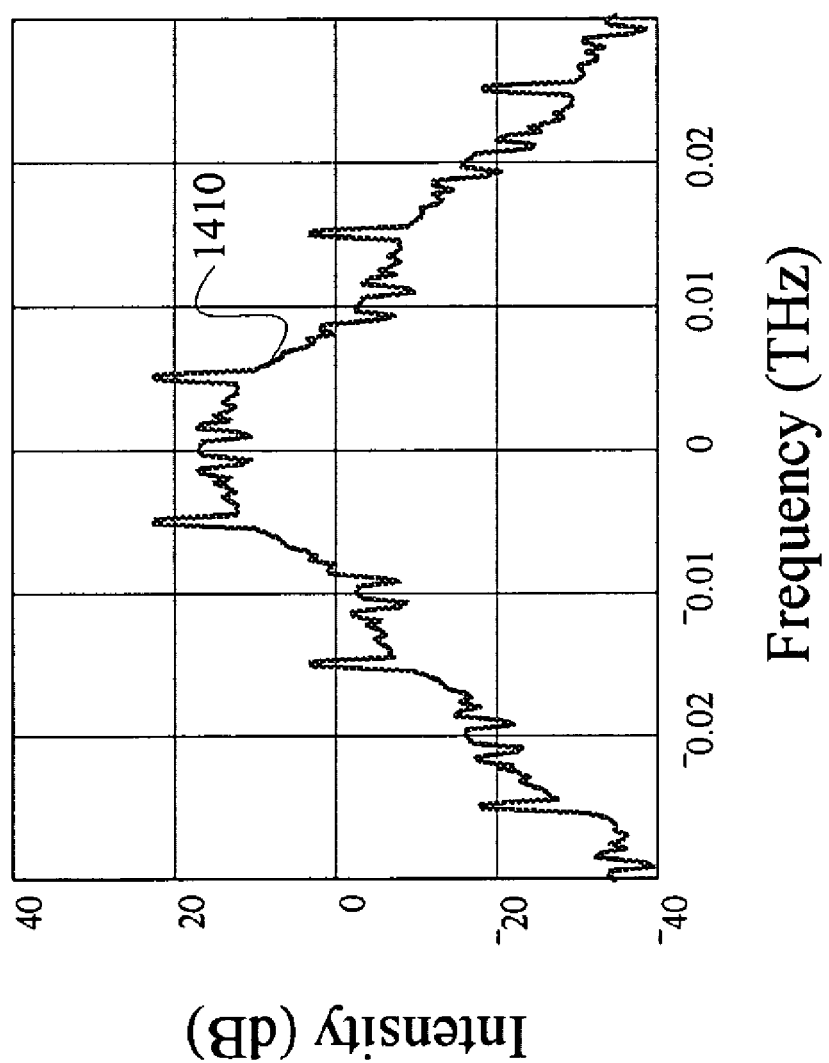
FIG. 9 is a simplified diagram showing intensity spectrum for an output signal according to an embodiment of the present invention.

FIG. 9 is a simplified diagram showing intensity spectrum for an output signal according to an embodiment of the present invention. This diagram is merely an example, which should not unduly limit the scope of the claims. One of ordinary skill in the art would recognize many variations, alternatives, and modifications. A curve 1410 represents optical intensity of an output signal as a function of frequency. For example, the output signal is the chirped CSRZ signal 1252 generated by the system 1200. The curve 1410 shows the absence of peak at the carrier frequency, which is characteristic for a CSRZ signal spectrum.

Figure 10:
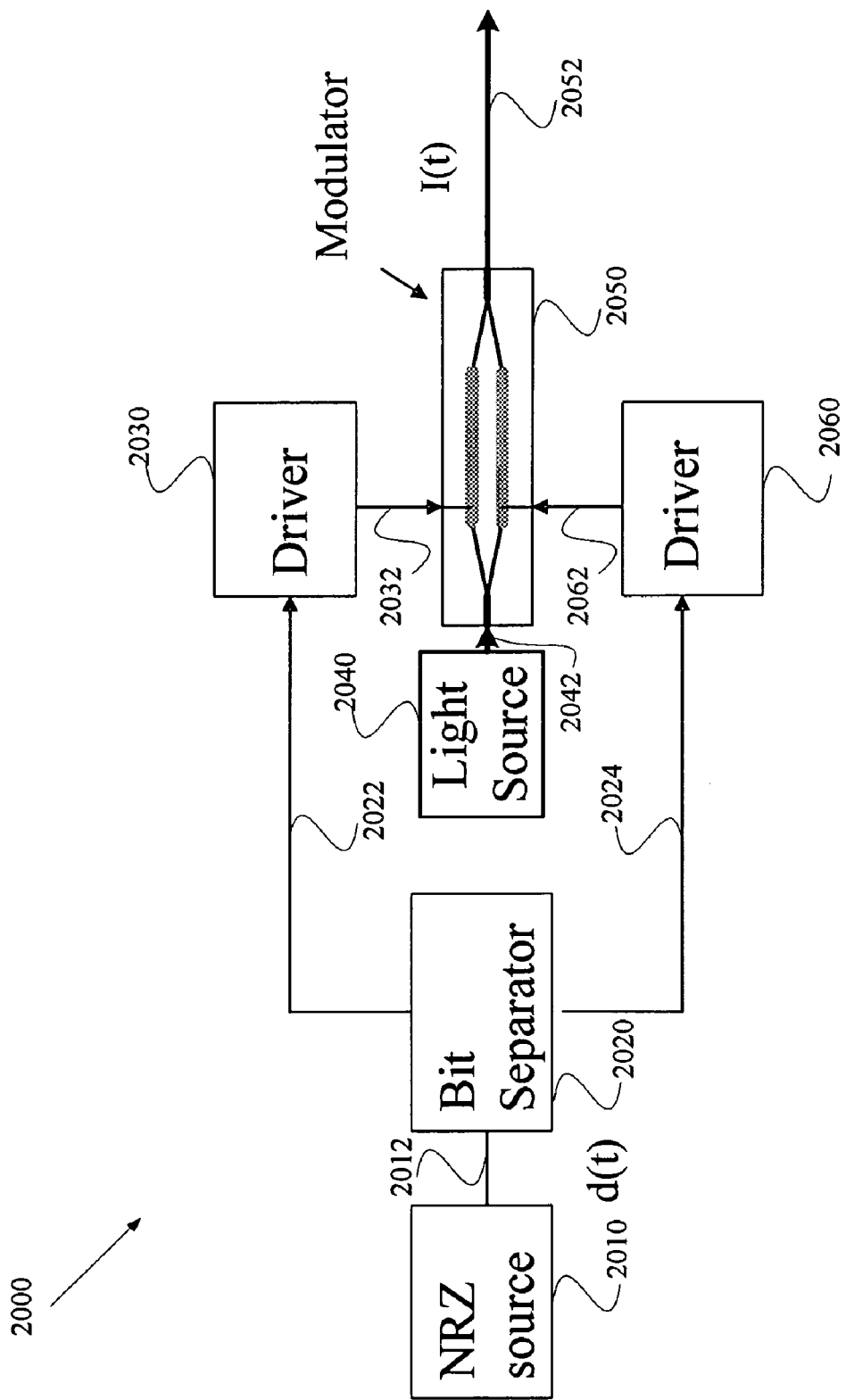
FIG. 10 is a simplified system for generating optical return-to-zero signals with alternating bi-phase shift and frequency chirp according to another embodiment of the present invention.

FIG. 10 is a simplified system for generating optical return-to-zero signals with alternating bi-phase shift and frequency chirp according to another embodiment of the present invention. This diagram is merely an example, which should not unduly limit the scope of the claims. One of ordinary skill in the art would recognize many variations, alternatives, and modifications. The system 2000 includes an NRZ source 2010, a bit separator 2020, drivers 2030 and 2060, a light source 2040, and a modulator 2050. Although the above has been shown using a selected group of apparatuses for the system 2000, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

The NRZ source 2010 provides an electrical NRZ signal 2012 to the bit separator 2020. For example, the NRZ signal 2012 switches between a logic high level and a logic low level as a function of time. The logic high level can be represented by "1", and the logic low level can be represented by "0". In another example, the NRZ signal 2012 represents data in a digital format based on the data information received from another device. In yet another example, the NRZ signal 2012 is represented by d(t).

As shown in FIG. 10, the NRZ signal 2012 is received by the bit separator 2020. For example, the bit separator 2020 is the bit separator 900 with certain modifications. In another example, the bit separator 2020 is the bit separator 1000 with some modifications. In one embodiment, the bit separator 2020 separates adjacent bits in the NRZ signal 2012 and generates two signals 2022 and 2024. The signal 2022 includes bits originated from the corresponding bits in the signal 2012. For example, any two of these corresponding bits are separated by at least another bit in the signal 2012. Additionally, the signal 2024 includes bits originated from the corresponding bits in the signal 2012. For example, any two of these corresponding bits are separated by at least another bit in the signal 2012. In another example, the bits in the signal 2012 that correspond to the signal 2022 and the bits in the signal 2012 that correspond to the signal 2024 do not overlap. In yet another example, every bit in the signal 2012 corresponds to only one bit in either the signal 2022 or the signal 2024.

In one embodiment, the signal 2012 includes even bits and odd bits, which are separated to form the signals 2022 and 2024 respectively. For example, the signal 2022 includes the even bits from the signal 2012 multiplied by −1 in signal strength and is represented by $\bar{d}_{EVEN}(t)$. Additionally, the signal 2024 includes the odd bits from the signal 2012 multiplied by −1 in signal strength and is represented by $\bar{d}_{ODD}(t)$. In another example, if an even bit in the signal 2012 is represented by a positive voltage, the corresponding bit in the signal 2022 is represented by a negative voltage. Additionally, if an odd bit in the signal 2012 is represented by a positive voltage, the corresponding bit in the signal 2024 is represented by a negative voltage.

The driver 2030 receives the signal 2022, and the driver 2060 receives the signal 2024. Additionally, the driver 2030 amplifies the signal 2022 and generates a driving signal 2032. The driver 2060 amplifies the signal 2024 and generates a driving signal 2062. For example, $\bar{d}_{EVEN}(t)$ and $\bar{d}_{ODD}(t)$ as the signals 2022 and 2024 are fed into the drivers 2030 and 2060 respectively. Accordingly, the driving signal 2032 is represented by $\bar{D}_{EVEN}$, and the driving signal 2062 is represented by $\bar{D}_{ODD}$. In one embodiment, the gains of the drivers 2030 and 2060 each are denoted as 2G. Hence $\bar{D}_{EVEN}$ and $\bar{D}_{ODD}$ are determined by:

$$\bar{D}_{EVEN} = 2 \cdot G \cdot \bar{d}_{EVEN}(t) \quad \text{(Equation 8A)}$$

$$\bar{D}_{ODD} = 2 \cdot G \cdot \bar{d}_{ODD}(t) \quad \text{(Equation 8B)}$$

As shown in FIG. 10, the driving signals 2032 and 2062 are received by the modulator 2050, which also receives a light 2042 from the light source 2040. For example, the light source 2040 includes a CW diode laser. The light 2042 is modulated by the driving signal 2032 and 2034 to generate an output optical signal 2052. For example, the modulator 2050 is a MZ modulator. Referring to Equations 2, 3A, 3B, 8A, and 8B, $D1(t) = \bar{D}_{EVEN}$ and $D2(t) = \bar{D}_{ODD}$. With proper DC bias voltages, the optical field for the output signal 2052 is $$E_{OUT} = E_{IN} \cdot \sin\{\eta \cdot G \cdot [d_{ODD}(t) - d_{EVEN}(t)]\} \cdot \quad \text{(Equation 9)}$$
$$\exp\{i \cdot [\eta \cdot G \cdot d(t)]\}$$

$$\text{where } d(t) = d_{EVEN}(t) + d_{ODD}(t) = [-\bar{d}_{EVEN}(t)] + \quad \text{(Equation 10)}$$
$$[-\bar{d}_{ODD}(t)]$$
$$= -[\bar{d}_{EVEN}(t) + \bar{d}_{ODD}(t)] = -\bar{d}(t)$$

$$\text{Accordingly, } \Delta v_{CHIRP} = \eta \cdot G \cdot d[d(t)]/dt \cdot (1/2 \cdot \pi) \quad \text{(Equation 11)}$$

where $\Delta v_{CHIRP}$ represents the frequency chirp, such as an instantaneous frequency deviation. As shown in Equations 9 and 11, the output signal 2052 is a chirped returned-to-zero (CRZ) signal in one embodiment of the present invention. In one embodiment, the chirped return-to-zero signal is a frequency-modulated signal. In another embodiment, the chirped return-to-zero signal has a frequency that varies with time, the variation of frequency staying within a range.

As shown in Equation 9, the phase modulation $\eta \cdot G \cdot d(t)$ is positively proportional to the input NRZ data $d(t)$ if $\eta$ is larger than zero. Hence the frequency chirp is positive in sign. In another example, the phase modulation $\eta \cdot G \cdot d(t)$ is negatively proportional to the input NRZ data $d(t)$ if $\eta$ is smaller than zero. Accordingly, the frequency chirp is negative in sign. Additionally, the signals 2012, 2022, 2024, 2032, and 2062 each are an electrical signal according to another embodiment of the present invention.

As discussed above and further emphasized here, FIG. 10 is merely an example, which should not unduly limit the scope of the claims. One of ordinary skill in the art would recognize many variations, alternatives, and modifications.

According to another embodiment of the present invention, the NRZ signal 2012 is received by the bit separator 2020. For example, the bit separator 2020 is the bit separator 900 or 1000. In one embodiment, the bit separator 2020 separates adjacent bits in the NRZ signal 2012 and generates two signals 2022 and 2024. The signal 2022 includes bits originated from the corresponding bits in the signal 2012. For example, any two of these corresponding bits are separated by at least another bit in the signal 2012. Additionally, the signal 2024 includes bits originated from the corresponding bits in the signal 2012. For example, any two of these corresponding bits are separated by at least another bit in the signal 2012. In another example, the bits in the signal 2012 that correspond to the signal 2022 and the bits in the signal 2012 that correspond to the signal 2024 do not overlap. In yet another example, every bit in the signal 2012 corresponds to only one bit in either the signal 2022 or the signal 2024. In yet another example, the sum of the signals 2022 and 2024 is equal to the signal 2012.

In one embodiment, the signal 2012 includes even bits and odd bits, which are separated to form the signals 2022 and 2024 respectively. The signal 2022 includes the even bits from the signal 2012 and is represented by $d_{EVEN}(t)$. Additionally, the signal 2024 includes the odd bits from the signal 2012, and is represented by $d_{ODD}(t)$. In another embodiment, the signals 2022 and 2024 each are an electrical return-to-zero signal. For example, the electrical return-to-zero signal has a bit rate that is half of the bit rate of the electrical non-return-to-zero signal 2012.

The driver 2030 receives the signal 2022, and the driver 2060 receives the signal 2024. Additionally, the driver 2030 amplifies the signal 2022 and generates a driving signal 2032. The driver 2060 amplifies the signal 2024 and generates a driving signal 2062. For example, $d_{EVEN}(t)$ and $d_{ODD}(t)$ as the signals 2022 and 2024 are fed into the drivers 2030 and 2060 respectively. Accordingly, the driving signal 2032 is represented by $\overline{D}_{EVEN}$, and the driving signal 2062 is represented by $\overline{D}_{ODD}$. In one embodiment, the gains of the drivers 2030 and 2060 each are denoted as 2G. Hence $\overline{D}_{EVEN}$ and $\overline{D}_{ODD}$ are determined by:

$$\overline{D}_{EVEN} = -2 \cdot G \cdot d_{EVEN}(t) \quad \text{(Equation 12A)}$$

$$\overline{D}_{ODD} = -2 \cdot G \cdot d_{ODD}(t) \quad \text{(Equation 12B)}$$

As shown in FIG. 10, the driving signals 2032 and 2062 are received by the modulator 2050, which also receives a light 2042 from the light source 2040. For example, the light source 2040 includes a CW diode laser. The light 2042 is modulated by the driving signal 2032 and 2034 to generate an output optical signal 2052. For example, the modulator 2050 is a MZ modulator. With proper DC bias voltages, the optical field for the output signal 2052 is determined by $$E_{OUT} = E_{IN} \cdot \sin\{\eta \cdot G \cdot [d_{ODD}(t) - d_{EVEN}(t)]\} \cdot \exp\{i \cdot [\eta \cdot G \cdot d(t)]\} \quad \text{(Equation 13)}$$

$$\text{where } d(t) = d_{EVEN}(t) + d_{ODD}(t) \quad \text{(Equation 14)}$$

$$\text{Accordingly, } \Delta v_{CHIRP} = \eta \cdot G \cdot d[d(t)]/dt \cdot (1/2 \cdot \pi) \quad \text{(Equation 15)}$$

where $\Delta v_{CHIRP}$ represents the frequency chirp, such as an instantaneous frequency deviation. As shown in Equations 13 and 15, the output signal 2052 is a chirped returned-to-zero (CRZ) signal in one embodiment of the present invention. In one embodiment, the chirped return-to-zero signal is a frequency-modulated signal. In another embodiment, the chirped return-to-zero signal has a frequency that varies with time, the variation of frequency staying within a range.

As shown in Equation 13, the phase modulation $\eta \cdot G \cdot d(t)$ is positively proportional to the input NRZ data $d(t)$ if $\eta$ is larger than zero. Hence the frequency chirp is positive in sign. In another example, the phase modulation $\eta \cdot G \cdot d(t)$ is negatively proportional to the input NRZ data $d(t)$ if $\eta$ is smaller than zero. Accordingly, the frequency chirp is negative in sign. Additionally, the signals 2012, 2022, 2024, 2032, and 2062 each are an electrical signal according to another embodiment of the present invention.

Figure 11:
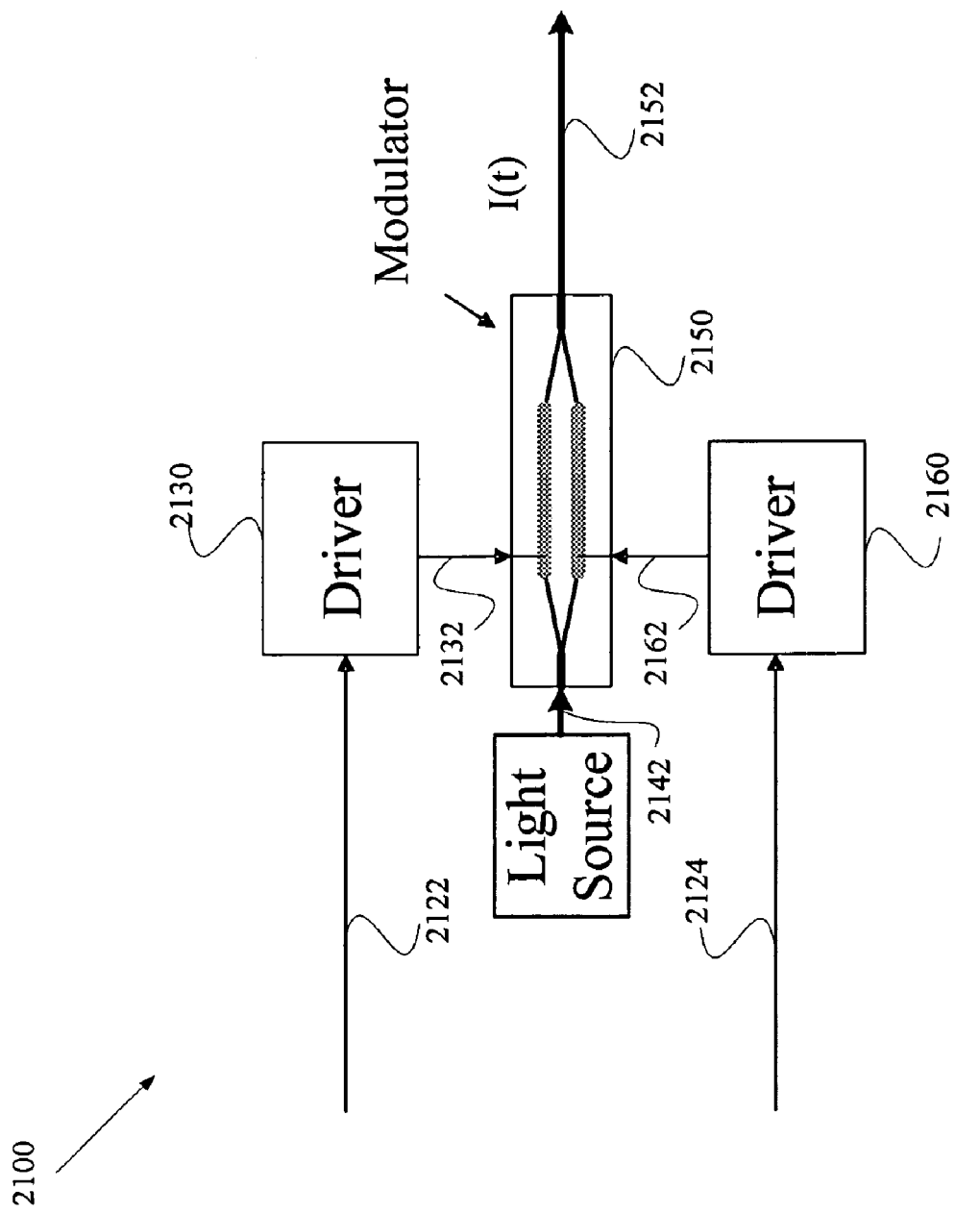
FIG. 11 is a simplified system for generating optical return-to-zero signals according to yet another embodiment of the present invention.

FIG. 11 is a simplified system for generating optical return-to-zero signals according to yet another embodiment of the present invention. This diagram is merely an example, which should not unduly limit the scope of the claims. One of ordinary skill in the art would recognize many variations, alternatives, and modifications. The system 2100 includes drivers 2130 and 2160, a light source 2140, and a modulator 2150. Although the above has been shown using a selected group of apparatuses for the system 2100, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

The driver 2130 receives a signal 2122, and the driver 2160 receives a signal 2124. The driver 2130 amplifies the signal 2122 to generate a driving signal 2132. Additionally, the driver 2160 amplifies the signal 2124 to generate a driving signal 2162. For example, the signals 2122 and 2124 each are an electrical return-to-zero signal. In another example, the signals 2122 and 2124 have the same duty cycles equal to or smaller than 50% and are synchronously interleaved.

As shown in FIG. 11, the driving signals 2132 and 2162 are received by the modulator 2150, which also receives a light 2142 from the light source 2140. For example, the light source 2140 includes a CW diode laser. The light 2142 is modulated by the driving signal 2132 and 2162 to generate an output optical signal 2152. In one embodiment, the modulator 2150 is a MZ modulator. For example, the electrodes of the MZ modulator are configured so that $\eta_1 = \eta_2 = \eta$. Additionally, the MZ modulator is biased with proper DC voltages such that $\phi = 0$. For example, with $\phi = 0$, the MZ modulator is referred to as being biased at null. Accordingly, the output signal 2152 is determined according to Equations 2, 3A, and 3B. In another embodiment, the output signal 2152 is an electro-optically time-division multiplexed (EOTDM) CSRZ signal. The EOTDM CSRZ signal has a data rate that is twice as high as the data rate for the input signal 2122 or 2124. For example, if each of the two electrical RZ signals 2122 and 2124 is at 5 Gbps, the output signal 2152 is an optical CSRZ signal at 10 Gbps.

According to another embodiment of the present invention, a system for generating an optical return-to-zero signal includes a bit separator configured to receive an electrical non-return-to-zero signal and generate a first input signal and a second input signal. Additionally, the system includes a first driver configured to receive the first input signal and generate a first driving signal. The first driving signal is proportional to the first input signal in signal strength. Moreover, the system includes a second driver configured to receive the second input signal and generate a second driving signal. The second driving signal is proportional to the second input signal in signal strength. Also, the system includes a light source configured to generate a light, and an electro-optical modulator configured to receive the light, the first driving signal, and the second driving signal, modulate the light with the first driving signal and the second driving signal, and generate an optical signal. The electrical non-return-to-zero signal includes a first plurality of bits and a second plurality of bits. The first input signal includes the first plurality of bits, and the second input signal includes the second plurality of bits. The optical signal is an optical chirped return-to-zero signal. For example, the system is implemented according to the system 1200.

According to yet another embodiment, a system for generating an optical return-to-zero signal includes a bit separator configured to receive an electrical non-return-to-zero signal and generate a first input signal and a second input signal. Additionally, the system includes a first driver configured to receive the first input signal and generate a first driving signal. The first driving signal is proportional to the first input signal in signal strength. Moreover, the system includes a second driver configured to receive the second input signal and generate a second driving signal. The second driving signal is proportional to the second input signal in signal strength. Also, the system includes a light source configured to generate a light, and an electro-optical modulator configured to receive the light, the first driving signal, and the second driving signal, modulate the light with the first driving signal and the second driving signal, and generate an optical signal. The electrical non-return-to-zero signal includes a first plurality of bits and a second plurality of bits. The first driving signal includes a third plurality of bits, and the third plurality of bits is equal to the first plurality of bits multiplied by a first negative number in signal strength. The second driving signal includes a fourth plurality of bits, and the fourth plurality of bits is equal to the second plurality of bits multiplied by a second negative number in signal strength. The optical signal is an optical chirped return-to-zero signal. For example, the system is implemented according to the system 2000.

According to yet another embodiment, a system for generating an optical return-to-zero signal includes a first driver configured to receive a first electrical return-to-zero signal and generate a first driving signal. The first driving signal is equal to the first electrical return-to-zero signal multiplied by a first positive number in signal strength. Additionally, the system includes a second driver configured to receive a second electrical return-to-zero signal and generate a second driving signal. The second driving signal is equal to the second electrical return-to-zero signal multiplied by a second positive number in signal strength. Moreover, the system includes a light source configured to generate a light, and an electro-optical modulator configured to receive the light, the first driving signal, and the second driving signal, modulate the light with the first driving signal and the second driving signal, and generate an optical signal. The first electrical return-to-zero signal is associated with a first data rate, and the second electrical return-to-zero signal is associated with a second data rate. The optical signal is an optical return-to-zero signal associated with a third data rate, and the third data rate being equal to a sum of the first data rate and the second data rate. For example, the first electrical return-to-zero signal includes a first plurality of bits, and the second electrical return-to-zero signal includes a second plurality of bits. The optical return-to-zero signal includes a third plurality of bits, and each of the third plurality of bits corresponds to one of the first plurality of bits or one of the second plurality of bits. In another example, the system is implemented according to the system 2100.

The present invention has various advantages. Some embodiments of the present invention provide systems and methods for generating optical chirped return-to-zero (CRZ) signals. Certain embodiments of the present invention provides systems and methods that separate an electrical non-return-to-zero (NRZ) signal into an "even bit signal" and an "odd bit signal", and then use the two signals to drive differentially Mach-Zehnder (MZ) electro-optical (EO) modulators to generate an optical CSRZ signal with frequency chirp. Some embodiments of the present invention provide systems and methods that use only components designed for NRZ transmitters to generate optical CRZ signals. For example, only one MZ data modulator is used to generate the CRZ signals. Certain embodiments of the present invention can significantly lower the cost of a transmitter for optical CRZ signals. Some embodiments of the present invention can significantly reduce the complexity of a transmitter for optical CRZ signals. Certain embodiments of the present invention can improve reliability of a transmitter for optical CRZ signals. Some embodiments of the present invention can significantly improve performance of a fiber optical transport system. For example, the fiber optical transport system is used for transmission at a high data rate, such as a rate higher than 10 Gbps.

Certain embodiments of the present invention can provide optical CSRZ signals with negative frequency chirp. For example, the CSRZ signals with negative frequency chirp often compress to shorter pulses after transmitting a certain distance in positive-dispersion fibers. In another example, the dispersion-limited distance for the CSRZ signals with negative frequency chirp is longer than both simple CSRZ signals and standard NRZ signals. Some embodiments of the present invention can provide optical CSRZ signals with positive frequency chirp. For example, the positive chirp can enhance signal resistance to distortions caused by nonlinear effects experienced during transmission. Certain embodiments of the present invention can use two signals with identical duty cycles and synchronously interleaved, and generate an electro-optically time-division multiplexed (EOTDM) CSRZ signal at twice the data rate for each of two signals.

Some embodiments of the present invention provide systems and methods that generate two half-rate electrical return-to-zero (eRZ) signals and use these two signals to drive differentially a dual drive Mach-Zehnder modulator biased at null to generate a full rate optical CSRZ signal with negative frequency chirp. For example, the systems and methods are implemented according to FIG. 5 and/or FIG. 10. Certain embodiments of the present invention provide systems and methods that generate two half-rate electrical return-to-zero (eRZ) signals and use these two signals to drive differentially a dual drive Mach-Zehnder modulator biased at null to generate a full rate optical CSRZ signal with positive frequency chirp. For example, the systems and methods are implemented according to FIG. 5 and/or FIG. 10.

Some embodiments of the present invention provide systems and method that separate an electrical non-return-to-zero (NRZ) signal into an "even bit signal" and an "odd bit signal", and then use the two signals to drive differentially a dual drive Mach-Zehnder modulator to generate an optical CSRZ signal with negative frequency chirp. For example, the systems and methods are implemented according to FIG. 5 and/or FIG. 10. Certain embodiments of the present invention provide systems and method that separate an electrical non-return-to-zero (NRZ) signal into an "even bit signal" and an "odd bit signal", and then use the two signals to drive differentially a dual drive Mach-Zehnder modulator to generate an optical CSRZ signal with positive frequency chirp. For example, the systems and methods are implemented according to FIG. 5 and/or FIG. 10.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for generating an optical return-to-zero signal, the system comprising:
   a bit separator configured to receive an electrical non-return-to-zero signal and generate a first input signal and a second input signal;
   a first driver configured to receive the first input signal and generate a first driving signal, the first driving signal being proportional to the first input signal in signal strength;
   a second driver configured to receive the second input signal and generate a second driving signal, the second driving signal being proportional to the second input signal in signal strength;
   a light source configured to generate a light;
   an electro-optical modulator configured to receive the light, the first driving signal, and the second driving signal, modulate the light with the first driving signal and the second driving signal, and generate an optical signal;
   wherein:
   the electrical non-return-to-zero signal includes a first plurality of bits and a second plurality of bits;
   the first input signal includes the first plurality of bits;
   the second input signal includes the second plurality of bits;
   the optical signal is an optical chirped return-to-zero signal.

2. The system of claim 1 wherein a sum of the first input signal and the second input signal is equal to the electrical non-return-to-zero signal.

3. The system of claim 1 wherein for the electrical non-return-to-zero signal:
   any two of the first plurality of bits are separated by at least one of the second plurality of bits;
   any two of the second plurality of bits are separated by at least one of the first plurality of bits.

4. The system of claim 3 wherein for the electrical non-return-to-zero signal:
   the first plurality of bits is even bits;
   the second plurality of bits is odd bits.

5. The system of claim 1, and further comprising a non-return-to-zero source configured to provide the electrical non-return-to-zero signal.

6. The system of claim 1 wherein each of the first input signal, the second input signal, the first driving signal, and the second driving signal is an electrical signal.

7. The system of claim 1 wherein the electro-optical modulator is a Mach-Zehnder modulator.

8. The system of claim 1 wherein:
   the first driving signal is equal to the first input signal multiplied by a first positive number in signal strength;
   the second driving signal is equal to the second input signal multiplied by a second positive number in signal strength.

9. The system of claim 8 wherein the first positive number and the second positive number are equal.

10. The system of claim 1 wherein the optical chirped return-to-zero signal is associated with a positive frequency chirp.

11. The system of claim 1 wherein the optical chirped return-to-zero signal is associated with a negative frequency chirp.

12. A system for generating an optical return-to-zero signal, the system comprising:
    a bit separator configured to receive an electrical non-return-to-zero signal and generate a first input signal and a second input signal;
    a first driver configured to receive the first input signal and generate a first driving signal, the first driving signal being proportional to the first input signal in signal strength;
    a second driver configured to receive the second input signal and generate a second driving signal, the second driving signal being proportional to the second input signal in signal strength;
    a light source configured to generate a light;
    an electro-optical modulator configured to receive the light, the first driving signal, and the second driving signal, modulate the light with the first driving signal and the second driving signal, and generate an optical signal;
    wherein:
    the electrical non-return-to-zero signal includes a first plurality of bits and a second plurality of bits;
    the first driving signal includes a third plurality of bits, the third plurality of bits equal to the first plurality of bits multiplied by a first negative number in signal strength;
    the second driving signal includes a fourth plurality of bits, the fourth plurality of bits equal to the second plurality of bits multiplied by a second negative number in signal strength;
    the optical signal is an optical chirped return-to-zero signal.

13. The system of claim 12 wherein the first negative number and the second negative number are equal.

14. The system of claim 12 wherein:
    the first input signal includes the first plurality of bits;
    the second input signal includes the second plurality of bits.

15. The system of claim 14 wherein a sum of the first input signal and the second input signal is equal to the electrical non-return-to-zero signal.

16. The system of claim 12 wherein:
    the first input signal includes the first plurality of bits multiplied by a third negative number in signal strength;

the second input signal includes the second plurality of bits multiplied by a fourth negative number in signal strength.

17. The system of claim 16 wherein:
the third genitive number and the fourth negative number are equal;
a sum of the first input signal and the second input signal is equal to the electrical non-return-to-zero signal multiplied by −1 in signal strength.

18. The system of claim 12 wherein for the electrical non-return-to-zero signal:
any two of the first plurality of bits are separated by at least one of the second plurality of bits;
any two of the second plurality of bits are separated by at least one of the first plurality of bits.

19. The system of claim 18 wherein for the electrical non-return-to-zero signal:
the first plurality of bits is even bits;
the second plurality of bits is odd bits.

20. The system of claim 12, and further comprising a non-return-to-zero source configured to provide the electrical non-return-to-zero signal.

21. The system of claim 12 wherein each of the first input signal, the second input signal, the first driving signal, and the second driving signal is an electrical signal.

22. The system of claim 12 wherein the electro-optical modulator is a Mach-Zehnder modulator.

23. The system of claim 12 wherein the optical chirped return-to-zero signal is associated with a positive frequency chirp.

24. The system of claim 12 wherein the optical chirped return-to-zero signal is associated with a negative frequency chirp.

25. A system for generating an optical return-to-zero signal, the system comprising:
a first driver configured to receive a first electrical return-to-zero signal and generate a first driving signal, the first driving signal being equal to the first electrical return-to-zero signal multiplied by a first positive number in signal strength;
a second driver configured to receive a second electrical return-to-zero signal and generate a second driving signal, the second driving signal being equal to the second electrical return-to-zero signal multiplied by a second positive number in signal strength;
a light source configured to generate a light;
an electro-optical modulator configured to receive the light, the first driving signal, and the second driving signal, modulate the light with the first driving signal and the second driving signal, and generate an optical signal;
wherein:
the first electrical return-to-zero signal is associated with a first data rate;
the second electrical return-to-zero signal is associated with a second data rate;
the optical signal is an optical return-to-zero signal associated with a third data rate, the third data rate being equal to a sum of the first data rate and the second data rate.

26. The system of claim 25 wherein:
the first electrical return-to-zero signal is associated with a first duty cycle;
the second electrical return-to-zero signal is associated with a second duty cycle;
the first duty cycle and the second duty cycle are equal;
each of the first duty cycle and the second duty cycle is equal to or smaller than 50%.

27. The system of claim 26 wherein the first electrical return-to-zero signal and the second electrical return-to-zero signal are synchronously interleaved.

28. The system of claim 27 wherein the optical return-to-zero signal is an electro-optically time-division multiplexed (EOTDM) CSRZ signal.

29. The system of claim 25 wherein the first positive number and the second positive number are equal.

30. The system of claim 25 wherein the electro-optical modulator is a Mach-Zehnder modulator.

31. The system of claim 25 wherein:
the first electrical return-to-zero signal includes a first plurality of bits;
the second electrical return-to-zero signal includes a second plurality of bits;
the optical return-to-zero signal includes a third plurality of bits;
each of the third plurality of bits corresponds to one of the first plurality of bits or one of the second plurality of bits.

* * * * *